United States Patent
Akashi et al.

(10) Patent No.: US 7,541,859 B2
(45) Date of Patent: Jun. 2, 2009

(54) CHARGE PUMP CIRCUIT

(75) Inventors: Hiroki Akashi, Osaka (JP); Takuya Ishii, Osaka (JP); Yoshiyuki Konishi, Shiga (JP); Makoto Ishimaru, Osaka (JP)

(73) Assignee: Panasonic Corporation, Osaka (JP)

( * ) Notice: Subject to any disclaimer, the term of this patent is extended or adjusted under 35 U.S.C. 154(b) by 98 days.

(21) Appl. No.: 11/753,671

(22) Filed: May 25, 2007

(65) Prior Publication Data

US 2007/0273430 A1 Nov. 29, 2007

(30) Foreign Application Priority Data

May 29, 2006 (JP) .............................. 2006-147685

(51) Int. Cl.
*G05F 3/16* (2006.01)
*H02M 3/18* (2006.01)

(52) U.S. Cl. .................. 327/536; 327/543; 363/60; 307/110

(58) Field of Classification Search ................... None
See application file for complete search history.

(56) References Cited

U.S. PATENT DOCUMENTS

| 6,563,235 | B1 * | 5/2003 | McIntyre et al. | ............ 307/109 |
| 6,834,001 | B2 * | 12/2004 | Myono | ......................... 363/60 |
| 7,233,508 | B2 * | 6/2007 | Itoh | ............................ 363/60 |
| 2008/0084239 | A1 * | 4/2008 | Oswald et al. | .............. 327/536 |

FOREIGN PATENT DOCUMENTS

JP 2003-348821 12/2003

* cited by examiner

*Primary Examiner*—Lincoln Donovan
*Assistant Examiner*—Terry L Englund
(74) *Attorney, Agent, or Firm*—RatnerPrestia

(57) ABSTRACT

For downsizing a charge pump circuit which selects a voltage multiple ratio, converts its input voltage and outputs the converted voltage, the number of switching devices of the charge pump circuit is reduced. The control circuit of the charge pump circuit is configured to carry out switching control for multiple switching devices and charge/discharge at least a first capacitor and a second capacitor so as to have at least a 2Vi mode for alternately repeating a first state and a second state, and a 1.5Vi mode for alternately repeating a third state and a fourth state, thereby carrying out boosting depending on the detected input voltage.

7 Claims, 10 Drawing Sheets

FIRST STATE

SECOND STATE

THIRD STATE

FOURTH STATE

FIRST STATE

SECOND STATE

THIRD STATE

FOURTH STATE

CHARGE PUMP CIRCUIT

BACKGROUND OF THE INVENTION

The present invention relates to a power supply circuit for supplying a DC voltage to various electronic apparatuses, more particularly, to a charge pump circuit for boosting an input voltage.

In recent years, such a charge pump circuit has been used frequently as a power supply circuit capable of outputting a voltage higher than an input voltage without using an inductor, and supplying a power supply voltage to a load requiring a relatively small consumption current.

As this kind of charge pump circuit, for example, a power supply circuit described in Japanese Patent Application Laid-open No. 2003-348821 is proposed. FIG. 8 is a circuit diagram showing the charge pump circuit disclosed in Japanese Patent Application Laid-open No. 2003-348821. The charge pump circuit disclosed therein selects a voltage multiple ratio of 1, 1.5 or 2 depending on the drop of an input power supply voltage, boosts the input voltage and outputs the boosted voltage. In FIG. 8, a DC input power supply (not shown), such as a battery, supplies a DC input voltage Vi to the input terminal 10 of the charge pump circuit. Numerals 101 to 107 designate P-channel MOS transistors, and numerals 108 and 109 designate N-channel MOS transistors. The charge pump circuit is provided with a first flying capacitor 110 and a second flying capacitor 111. An output capacitor 112 outputs an output voltage Vo from the output terminal 20 of the charge pump circuit.

The drain of the P-channel MOS transistor 101, the source of the P-channel MOS transistor 102, one terminal of the P-channel MOS transistor 103, and the source of the P-channel MOS transistor 104 are connected to the input terminal 10. The source of the P-channel MOS transistor 101 is connected to the drain of the P-channel MOS transistor 105 and one terminal of the first flying capacitor 110. This connection point is referred to as a terminal P1. The drain of the P-channel MOS transistor 102 is connected to the drain of the P-channel MOS transistor 106, the other terminal of the first flying capacitor 110, and the drain of the N-channel MOS transistors 108. This connection point is referred to as a terminal P2. The other terminal of the P-channel MOS transistor 103 is connected to the source of the P-channel MOS transistor 106, one terminal of the second flying capacitor 111, and the drain of the P-channel MOS transistor 107. This connection point is referred to as a terminal P3. The drain of the P-channel MOS transistor 104 is connected to the other terminal of the second flying capacitor 111 and the drain of the N-channel MOS transistor 109. This connection point is referred to as a terminal P4.

The source of the P-channel MOS transistor 105 and the source of the P-channel MOS transistor 107 are connected to the output terminal 20, and the source of the N-channel MOS transistor 108 and the source of the N-channel MOS transistor 109 are grounded. Control signals S01 to S07 are applied to the gates of the P-channel MOS transistors 101 to 107, respectively. Control signals S08 and S09 are applied to the gates of the N-channel MOS transistors 108 and 109, respectively. Furthermore, a switch 113 is configured so that the back gate of the P-channel MOS transistor 103 can be switched to the side of the input terminal 10 or the side of the terminal P3 according to a control signal S10.

The circuit diagrams shown in FIGS. 9 to 11B are equivalent circuit diagrams each showing the state of each switch in each operation mode of the conventional charge pump circuit shown in FIG. 8. FIG. 9 shows the operation mode having a voltage multiple ratio of 1, FIGS. 10A and 10B show the operation mode having a voltage multiple ratio of 1.5, and FIGS. 11A and 11B show the operation mode having a voltage multiple ratio of 2.

The operation of the conventional charge pump circuit shown in FIG. 8 will be described below referring to FIGS. 9 to 11B.

In the operation mode having a voltage multiple ratio of 1 shown in FIG. 9, the P-channel MOS transistors 101 to 103 and 105 to 107 are ON, and the P-channel MOS transistor 104 and the N-channel MOS transistors 108 and 109 are OFF. The switch 113 connects the back gate of the P-channel MOS transistor 103 to the side of the input terminal 10 although this connection is not shown. In this operation mode, the input terminal 10 is connected to the output terminal 20 via the P-channel MOS transistors 101 and 105, these transistors being ON, and a voltage of 1 times the input voltage Vi is output.

In the operation mode having a voltage multiple ratio of 1.5 shown in FIGS. 10A and 10B, in the state shown in FIG. 10A, the P-channel MOS transistors 101, 106 and the N-channel MOS transistor 109 are ON, and the P-channel MOS transistors 102 to 105, the P-channel MOS transistor 107, and the N-channel MOS transistor 108 are OFF. The switch 113 connects the back gate of the P-channel MOS transistor 103 to the side of the input terminal 10 although this connection is not shown. In this state, the first flying capacitor 110 and the second flying capacitor 111 are connected in series, and the input voltage Vi is applied across both ends of the series connection. Hence, the first flying capacitor 110 and the second flying capacitor 111 are each charged to approximately half of the input voltage Vi.

In the state shown in FIG. 10B, the P-channel MOS transistors 102, 104, 105 and 107 are ON, and the P-channel MOS transistors 101, 103 and 106, and the N-channel MOS transistors 108 and 109 are OFF. The switch 113 connects the back gate of the P-channel MOS transistor 103 to the side of the second flying capacitor 111 although this connection is not shown. In this state, the first flying capacitor 110 and the second flying capacitor 111 are connected in parallel, and the low-potential side thereof is connected to the input terminal 10, and the high-potential side thereof is connected to the output terminal 20. The voltages of the two flying capacitors, amounting to approximately half of the input voltage Vi, are added to the input voltage Vi of the input terminal 10. As a result, a voltage of approximately 1.5 times the input voltage Vi is output from the output terminal 20.

Since the states shown in FIGS. 10A and 10B are repeated alternately as described above, it is possible to obtain a voltage of approximately 1.5 times the input voltage Vi from the output terminal 20.

In the operation mode having a voltage multiple ratio of 2 shown in FIGS. 11A and 11B, in the state shown in FIG. 11A, the P-channel MOS transistors 101, 103 and the N-channel MOS transistors 108 and 109 are ON, and the P-channel MOS transistors 102 and 104 to 107 are OFF. The switch 113 connects the back gate of the P-channel MOS transistor 103 to the side of the input terminal 10 although this connection is not shown. In this state, the input voltage Vi is applied to each of the first flying capacitor 110 and the second flying capacitor 111.

In the state shown in FIG. 11B, the P-channel MOS transistors 102, 104, 105 and 107 are ON, and the P-channel MOS transistors 101, 103 and 106, and the N-channel MOS transistors 108 and 109 are OFF. The switch 113 connects the back gate of the P-channel MOS transistor 103 to the side of the second flying capacitor 111 although this connection is not shown. In this state, the first flying capacitor 110 and the second flying capacitor 111 are connected in parallel, and the low-potential side thereof is connected to the input terminal 10, and the high-potential side thereof is connected to the output terminal 20. The voltages of the two flying capacitors, amounting to the input voltage Vi, are added to the input voltage Vi of the input terminal 10. As a result, a voltage of approximately 2 times the input voltage Vi is output from the output terminal 20.

Since the states shown in FIGS. 11A and 11B are repeated alternately as described above, it is possible to obtain a voltage of approximately 2 times the input voltage Vi from the output terminal 20.

In Japanese Patent Application Laid-open No. 2003-348821, a switch for switching the back gate of the P-channel MOS transistor 106 to the side of the first flying capacitor 110 or the side of the second flying capacitor 111 is described, and a sequence of switching various switches, being used to prevent through current, is explained.

The conventional charge pump circuit being configured and operating as described above is used frequently in compact and portable electronic apparatuses operating on battery power, and the components thereof are integrated in semiconductor ICs. Hence, reducing the number of switching devices being used as the components of the charge pump circuit is a very important object to be attained.

SUMMARY OF THE INVENTION

For the purpose of downsizing a charge pump circuit that selects a voltage multiple ratio of 1, 1.5 or 2, converts its input voltage and outputs the converted voltage, the present invention is intended to provide a charge pump circuit capable of reducing the number of switching devices being used as the components of the charge pump circuit and capable of contributing to downsizing and portability of electronic apparatuses.

For the purpose of attaining the above-mentioned object, a charge pump circuit according to a first aspect of the present invention comprises:

an input terminal to which an input voltage is input; an output terminal from which an output voltage is output; a ground terminal; capacitor means having at least a first capacitor and a second capacitor; multiple switches; and a control circuit for controlling the ON/OFF operations of the multiple switches, wherein the control circuit has:

an operation mode (2Vi mode, Vi means input voltage) in which a voltage multiple ratio of 2 is obtained by alternately repeating a first state wherein the first capacitor is charged by the input voltage, and the second capacitor is connected between the input and output terminals and discharged to the output side, and a second state wherein the second capacitor is charged by the input voltage, and the first capacitor is connected between the input and output terminals and discharged to the output side; and another operation mode (1.5Vi mode) in which a voltage multiple ratio of 1.5 is obtained by alternately repeating a third state wherein the first capacitor and the second capacitor are connected in series and charged by the input voltage, and a fourth state wherein the first capacitor and the second capacitor are connected in parallel between the input terminal and output terminals and discharged to the output side. In the charge pump circuit according to the present invention configured as described above, the number of the switching devices being used as the components thereof can be reduced.

It is thus possible to attain downsizing and portability of an electronic apparatus incorporating the charge pump circuit that can change its voltage multiple ratio.

In addition, a charge pump circuit according to a second aspect of the present invention is the charge pump circuit according to the first aspect, having a first switch connected between the input terminal and one terminal of the first capacitor; a second switch connected between the input terminal and the other terminal of the first capacitor; a third switch connected between the other terminal of the first capacitor and one terminal of the second capacitor; a fourth switch connected between the input terminal and the other terminal of the second capacitor; a fifth switch connected between the one terminal of the first capacitor and the output terminal; a sixth switch connected between the other terminal of the first capacitor and the ground terminal; a seventh switch connected between the one terminal of the second capacitor and the output terminal; and an eighth switch connected between the other terminal of the second capacitor and the ground terminal, wherein the control circuit carries out control so that:

in the first state, the first switch, the fourth switch, the sixth switch, and the seventh switch are ON, and the other switches are OFF;

in the second state, the second switch, the third switch, the fifth switch, and the eighth switch are ON, and the other switches are OFF;

in the third state, the first switch, the third switch, and the eighth switch are ON, and the other switches are OFF; and in the fourth state, the second switch, the fourth switch, the fifth switch, and the seventh switch are ON, and the other switches are OFF. In the present invention configured as described above, it is possible to attain downsizing of the charge pump circuit that selects a voltage multiple ratio, converts its input voltage, and outputs the converted voltage.

Furthermore, a charge pump circuit according to a third aspect of the present invention is the charge pump circuit according to the second aspect, wherein the control circuit may be configured to have a 1Vi mode (1×Vi mode) in which the first switch, the third switch, the fifth switch, and the eighth switch are ON, and the other switches are OFF.

Moreover, a charge pump circuit according to a fourth aspect of the present invention is the charge pump circuit according to the third aspect, wherein the control circuit may select the 2Vi mode, the 1.5Vi mode, or the 1Vi mode on the basis of the input voltage.

A charge pump circuit according to a fifth aspect of the present invention, comprises:

an input terminal to which an input voltage is input;

an output terminal from which an output voltage is output;

a ground terminal;

capacitor means having at least a first capacitor and a second capacitor;

a first switch connected between the input terminal and one terminal of the first capacitor;

a second switch connected between the other terminal of the first capacitor and one terminal of the second capacitor;

a third switch connected between the input terminal and the other terminal of the second capacitor;

a fourth switch connected between the one terminal of the first capacitor and the one terminal of the second capacitor;

a fifth switch connected between the one terminal of the first capacitor and the output terminal;

a sixth switch connected between the other terminal of the second capacitor and the ground terminal;

a seventh switch connected between the other terminal of the first capacitor and the other terminal of the second capacitor; and a control circuit for controlling the ON/OFF operations of the respective switches, wherein the control circuit has:

an operation mode (2Vi mode) in which a voltage multiple ratio of 2 is obtained by alternately repeating a first state wherein the first capacitor and the second capacitor are connected in parallel and charged by the input voltage, a second state wherein the first capacitor and the second capacitor are connected in parallel between the input and output terminals and discharged to the output side; and another operation mode (1.5Vi mode) in which a voltage multiple ratio of 1.5 is obtained by alternately repeating a third state wherein the first capacitor and the second capacitor are connected in series and charged by the input voltage, and a fourth state wherein the first capacitor and the second capacitor are connected in parallel between the input and output terminals and discharged to the output side. In the charge pump circuit according to the present invention configured as described above, the number of the switching devices being used as the components thereof can be reduced. It is thus possible to attain downsizing and portability of an electronic apparatus incorporating the charge pump circuit that can change its voltage multiple ratio.

Still further, a charge pump circuit according to a sixth aspect of the present invention is the charge pump circuit according to the fifth aspect, wherein the control circuit carries out control so that:

in the first state, the first switch, the fourth switch, the sixth switch, and the seventh switch are ON, and the other switches are OFF;

in the second state, the third switch, the fourth switch, the fifth switch, and the seventh switch are ON, and the other switches are OFF;

in the third state, the first switch, the second switch, and the sixth switch are ON, and the other switches are OFF; and in the fourth state, the third switch, the fourth switch, the fifth switch, and the seventh switch are ON, and the other switches are OFF. In the present invention configured as described above, it is possible to attain downsizing of the charge pump circuit that selects a voltage multiple ratio, converts its input voltage, and outputs the converted voltage.

Still further, a charge pump circuit according to a seventh aspect of the present invention is the charge pump circuit according to the sixth aspect, wherein the control circuit may be configured to have a 1Vi mode in which the first switch, the second switch, the fifth switch, and the sixth switch are ON, and the other switches are OFF.

Still further, a charge pump circuit according to an eighth aspect of the present invention is the charge pump circuit according to the seventh aspect, wherein the control circuit may select the 2Vi mode, the 1.5Vi mode, or the 1Vi mode on the basis of the input voltage.

Still further, a charge pump circuit according to a ninth aspect of the present invention is the charge pump circuit according to the fifth aspect, wherein the seventh switch may be formed of a P-channel MOS transistor and an N-channel MOS transistor connected in parallel.

Still further, a charge pump circuit according to a 10th aspect of the present invention is the charge pump circuit according to the fifth aspect, wherein a feedback circuit for adjusting the ON-resistance of the sixth switch may be provided to control the output voltage. The output voltage can be controlled to a predetermined value by controlling the ON-resistance of the sixth switch using the feedback circuit provided as described above.

Still further, a charge pump circuit according to an 11th aspect of the present invention is the charge pump circuit according to the 10th aspect that may have a configuration wherein the feedback circuit has a comparator for comparing the output voltage with a reference voltage and amplifying the difference therebetween, the sixth switch is OFF when the drive signal for the sixth switch is OFF, and the sixth switch is driven by the output of the comparator when the drive signal for the sixth switch is ON.

The present invention can provide a charge pump circuit, serving as a power supply circuit, that selects a voltage multiple ratio of 1, 1.5 or 2, converts its input voltage and outputs the converted voltage using a simple configuration having fewer switching devices than the conventional charge pump circuit.

It will be recognized that some or all of the figures are schematic representations for purposes of illustration and do not necessarily depict the actual relative sizes or locations of the elements shown.

DETAILED DESCRIPTION OF THE PREFERRED EMBODIMENTS

Preferred embodiments of a charge pump circuit according to the present invention will be described below referring to the accompanying drawings.

First Embodiment

Figure 1:
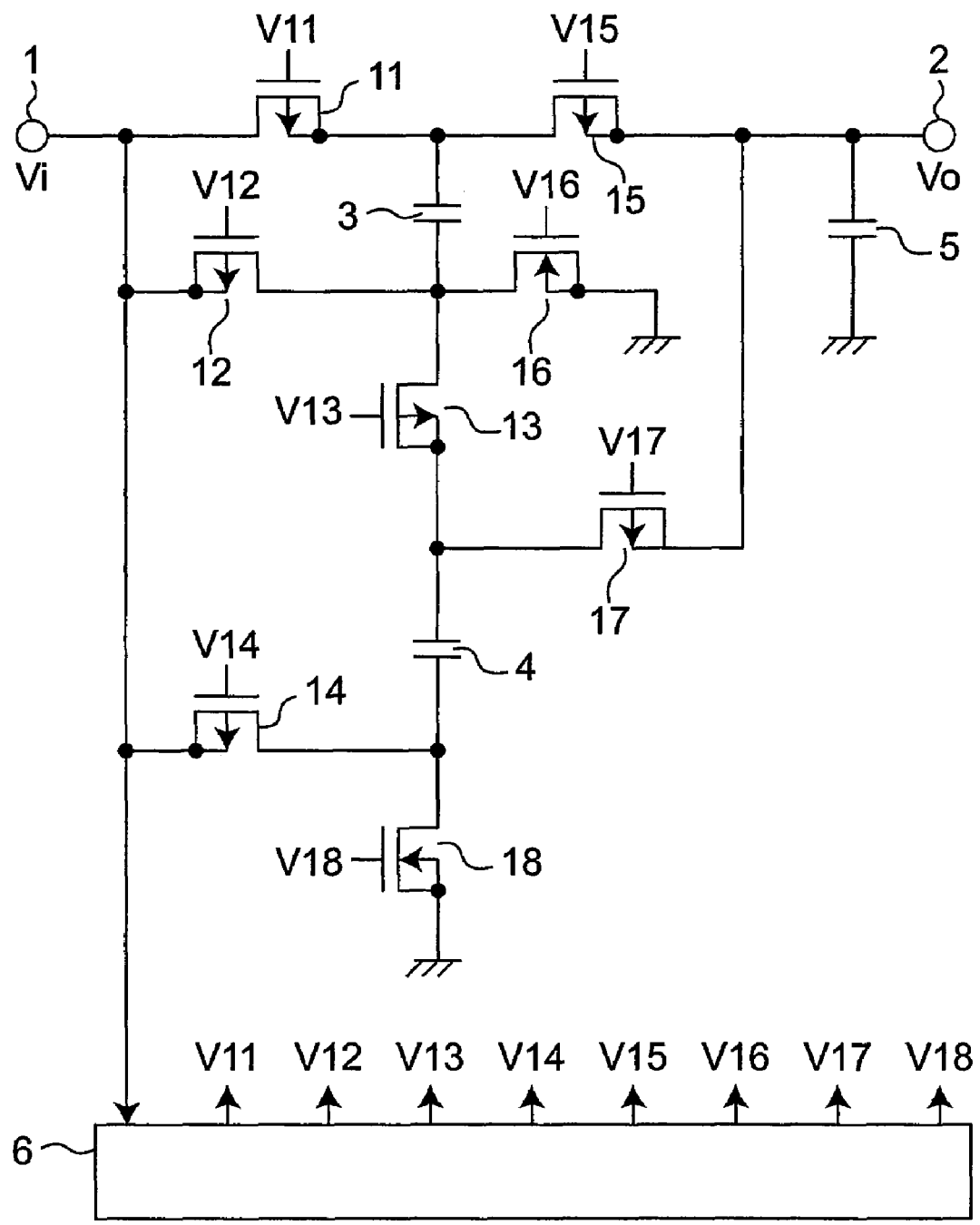
FIG. 1 is a circuit diagram showing a charge pump circuit according to a first embodiment of the present invention.

First, a charge pump circuit according to a first embodiment of the present invention will be described referring to the accompanying drawings, FIGS. 1 to 3C. FIG. 1 is a circuit diagram showing the charge pump circuit according to the first embodiment of the present invention.

In the charge pump circuit according to the first embodiment shown in FIG. 1, a DC input voltage Vi is applied to an input terminal 1, the input voltage Vi is detected, a voltage multiple ratio is selected, and a desired output voltage Vo is output from an output terminal 2. The charge pump circuit according to the first embodiment comprises eight switching devices, a first capacitor 3, a second capacitor 4, and an output capacitor 5. The output capacitor 5 is connected to the output terminal 2, and the DC output voltage Vo is output to a load (not shown). The first capacitor 3 and the second capacitor 4 have the same capacitance.

A control circuit 6 outputs drive signals V11, V12, V13, V14, V15, V16, V17 and V18 to the corresponding respective switching devices and controls the switching devices. The first switch 11 is connected between the input terminal 1 and one terminal of the first capacitor 3, and is turned ON/OFF by the drive signal Vi. The second switch 12 is connected between the input terminal 1 and the other terminal of the first capacitor 3, and is turned ON/OFF by the drive signal V12. The third switch 13 is connected between the other terminal of the first capacitor 3 and one terminal of the second capacitor 4, and is turned ON/OFF by the drive signal V13. The fourth switch 14 is connected between the input terminal 1 and the other terminal of the second capacitor 4, and is turned ON/OFF by the drive signal V14. The fifth switch 15 is connected between the one terminal of the first capacitor 3 and the output terminal 2, and is turned ON/OFF by the drive signal V15. The sixth switch 16 is connected between the other terminal of the first capacitor 3 and the ground, and is turned ON/OFF by the drive signal V16. The seventh switch 17 is connected between the one terminal of the second capacitor 4 and the output terminal 2, and is turned ON/OFF by the drive signal V17. The eighth switch 18 connected between the other terminal of the second capacitor 4 and the ground, and is turned ON/OFF by the drive signal V18. Furthermore, the sixth switch 16 and the eighth switch 18 are N-channel MOS transistors, and the other switching devices are P-channel MOS transistors.

The control circuit 6 detects the input voltage Vi and compares the detected input voltage Vi with a first predetermined value (X) and a second predetermined value (Y). The first predetermined value (X) is set lower than the second predetermined value (Y) (X<Y). When the input voltage Vi is lower than the first predetermined value (X) (Vi<X), the control circuit 6 selects an operation mode having a voltage multiple ratio of 2 (2Vi mode, Vi means input voltage). When the input voltage Vi is equal to or more than the first predetermined value (X) and lower than the second predetermined value (Y) (X≦Vi<Y), the control circuit 6 selects an operation mode having a voltage multiple ratio of 1.5 (1.5Vi mode). When the input voltage Vi is equal to or more than the second predetermined value (Y) (Y≦Vi), the control circuit 6 selects an operation mode having a voltage multiple ratio of 1 (1Vi mode). Then, the control circuit 6 controls the ON/OFF operations of the respective switching devices. Boosting the input voltage Vi as described above can compensate for any voltage drop in a DC power supply, such as a battery.

Figure 2A:
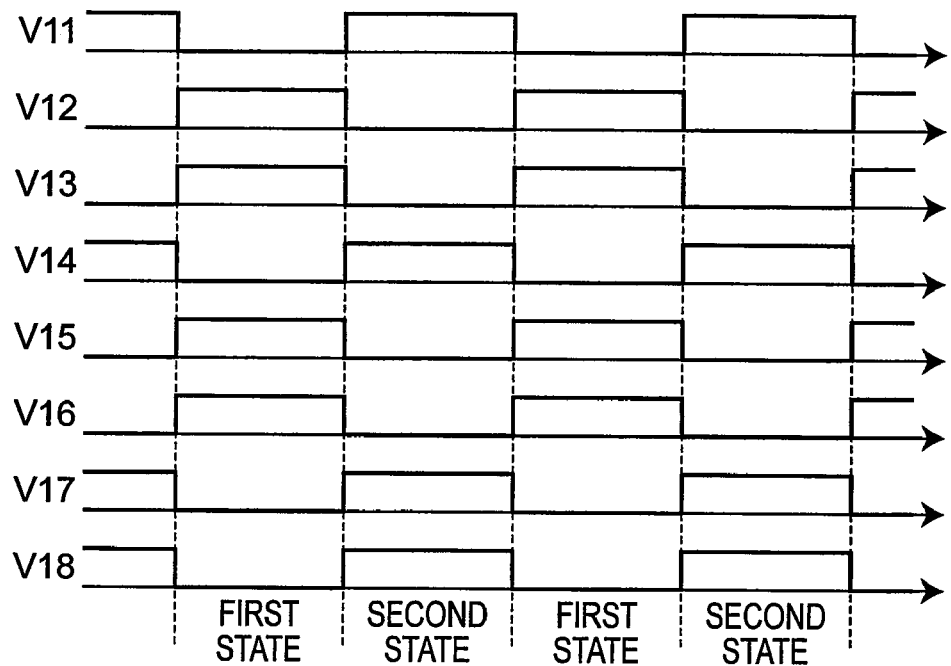
FIG. 2A is a timing chart showing various drive signals in the 2Vi mode of the charge pump circuit according to the first embodiment.
Figure 2B:
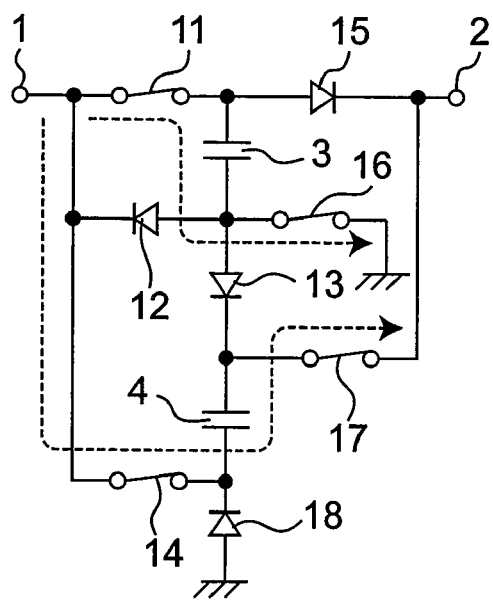
FIG. 2B is an equivalent circuit diagram showing a first state in the 2Vi mode of the charge pump circuit according to the first embodiment.
Figure 2C:
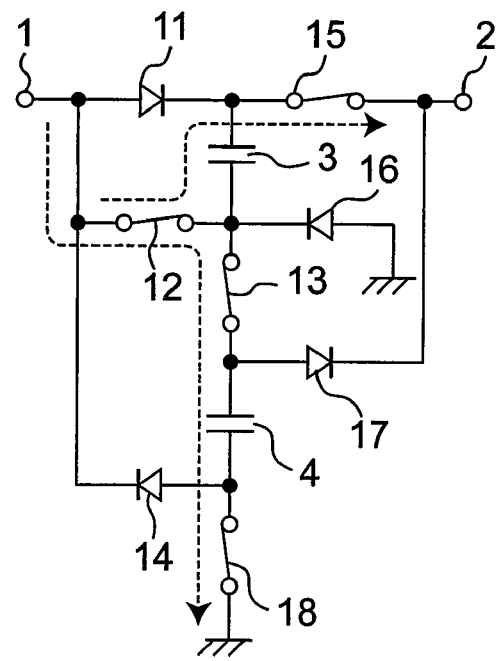
FIG. 2C is an equivalent circuit diagram showing a second state in the 2Vi mode of the charge pump circuit according to the first embodiment.

FIG. 2A shows the operation waveforms of the drive signals V11 to V18 in the 2Vi mode. FIGS. 2B and 2C are equivalent circuit diagrams showing the ON/OFF states of the respective switching devices in the first and second states of the 2Vi mode.

As shown in FIG. 2B, in the first state of the 2Vi mode, the first switch 11, the fourth switch 14, the sixth switch 16, and the seventh switch 17 are ON, and the other switches are OFF. Each switch being OFF is shown with a body diode. Hence, in the first state, the first capacitor 3 is charged by the input voltage Vi, and the second capacitor 4 is connected between the input terminal 1 and the output terminal 2, and its charge is discharged to the output side.

Next, as shown in FIG. 2C, in the second state of the 2Vi mode, the second switch 12, the third switch 13, the fifth switch 15, and the eighth switch 18 are ON, and the other switches are OFF. Hence, the second capacitor 4 is charged by the input voltage Vi, and the first capacitor 3 is connected between the input terminal 1 and the output terminal 2, and its charge is discharged to the output side.

As described above, in the 2Vi mode, the first state and the second state are repeated alternately, whereby the voltage charged in the first capacitor 3 and the voltage charged in the second capacitor 4 are added alternately to the input voltage Vi of the input terminal 1. As a result, a voltage equal to approximately 2 times the input voltage Vi is generated at the output terminal 2.

Figure 3A:
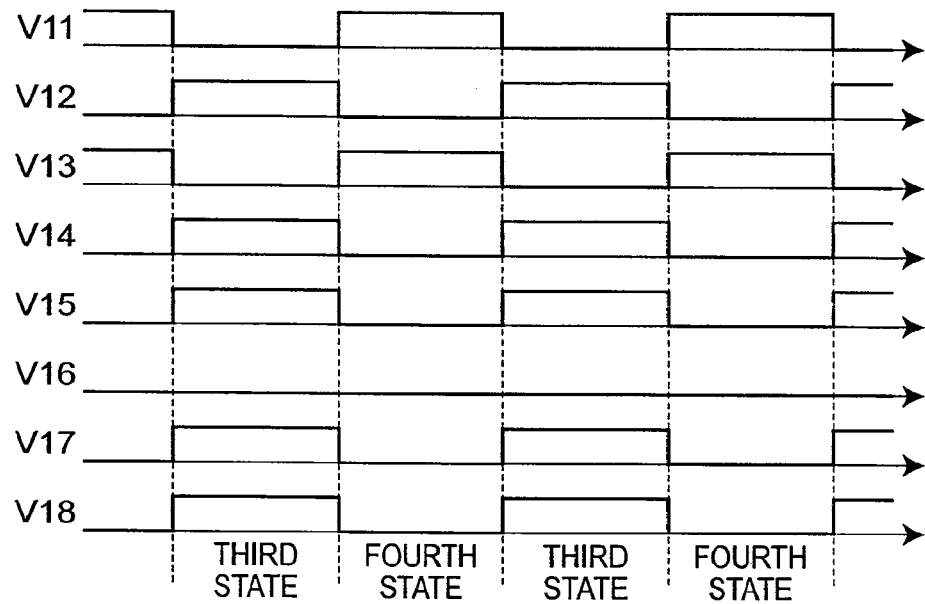
FIG. 3A is a timing chart showing various drive signals in the 1.5Vi mode of the charge pump circuit according to the first embodiment.
Figure 3B:
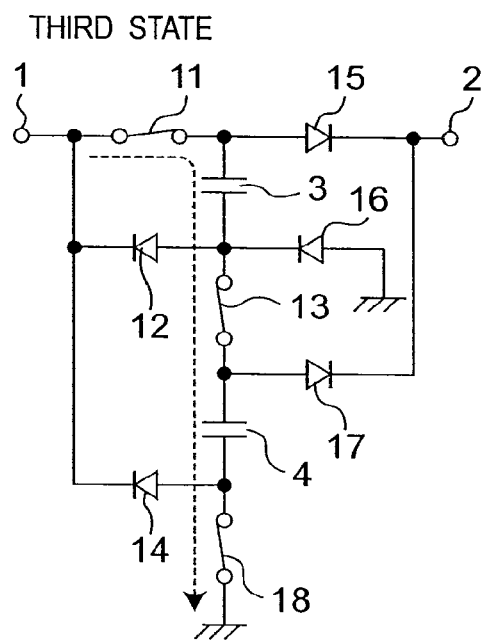
FIG. 3B is an equivalent circuit diagram showing a third state in the 1.5Vi mode of the charge pump circuit according to the first embodiment.
Figure 3C:
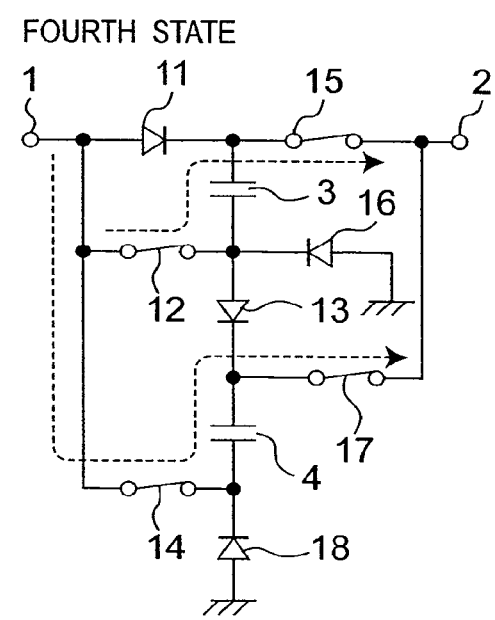
FIG. 3C is an equivalent circuit diagram showing a fourth state in the 1.5Vi mode of the charge pump circuit according to the first embodiment.

FIG. 3A shows the operation waveforms of the drive signals V11 to V18 in the 1.5Vi mode. FIGS. 3B and 3C are equivalent circuit diagrams showing the ON/OFF states of the respective switching devices in the third and fourth states of the 1.5Vi mode.

As shown in FIG. 3B, in the third state of the 1.5Vi mode, the first switch 11, the third switch 13, and the eighth switch 18 are ON, and the other switches are OFF. Each switch being OFF is shown with a body diode. Hence, in the third state, the first capacitor 3 and the second capacitor 4 are connected in series and charged by the input voltage Vi. In other words, the first capacitor 3 and the second capacitor 4 are each charged by approximately half (Vi/2) of the input voltage Vi.

Next, as shown in FIG. 3C, in the fourth state of the 1.5Vi mode, the second switch 12, the fourth switch 14, the fifth switch 15, and the seventh switch 17 are ON, and the other switches are OFF. Hence, the first capacitor 3 and the second capacitor 4 are connected in parallel between the input terminal 1 and the output terminal 2, and their charges are discharged to the output side.

As described above, in the 1.5Vi mode, the third state and the fourth state are repeated alternately, whereby the voltage charged in each capacitor in the third state, amounting to approximately half (Vi/2) of the input voltage Vi, is added to the input voltage Vi of the input terminal 1 in the fourth state.

As a result, a voltage equal to approximately 1.5 times the input voltage Vi is generated at the output terminal 2.

In the 1Vi mode, although not shown, the first switch 11, the third switch 13, the fifth switch 15, and the eighth switch 18 are ON, and the other switches are OFF. Hence, the first capacitor 3 and the second capacitor 4 are connected in series and charged by the input voltage Vi, and the input terminal 1 and the output terminal 2 are short-circuited by the first switch 11 and the fifth switch 15, these two switches being ON. As a result, a voltage equal to approximately 1 times the input voltage Vi is generated at the output terminal 2.

Figure 8:
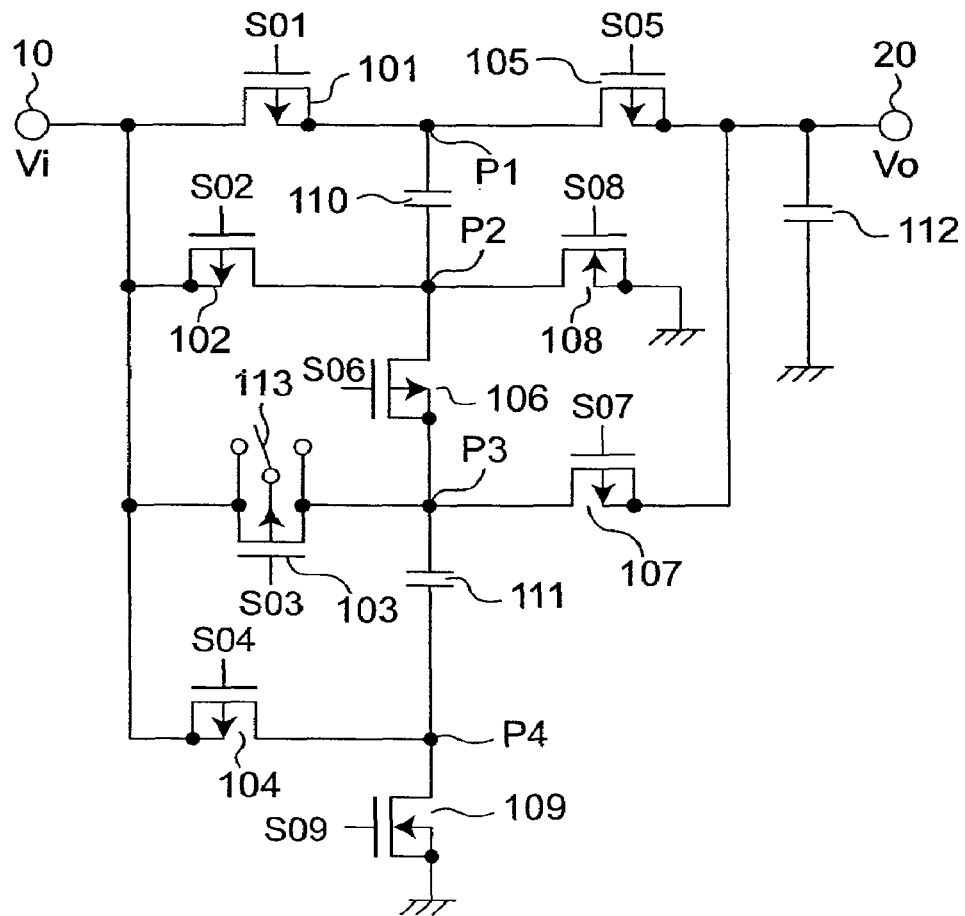
FIG. 8 is a circuit diagram showing the conventional charge pump circuit.
Figure 9:
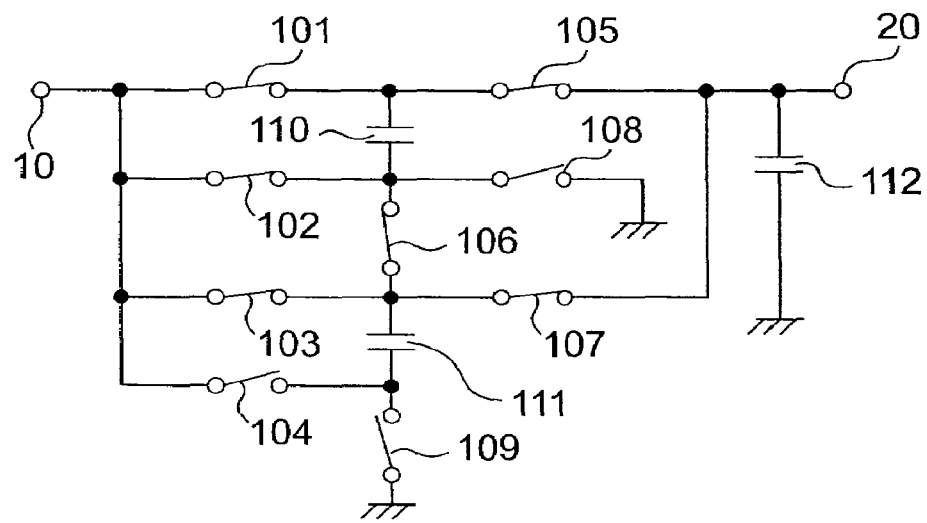
FIG. 9 is an equivalent circuit diagram showing the 1Vi mode of the conventional charge pump circuit.
Figure 10A:
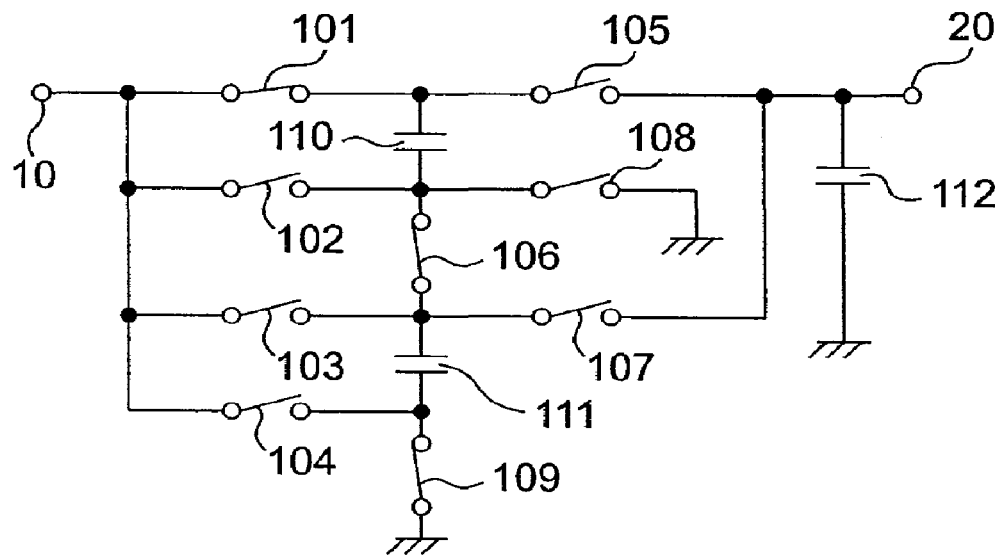
FIGS. 10A and 10B are equivalent circuit diagrams showing the 1.5Vi mode of the conventional charge pump circuit.
Figure 10B:
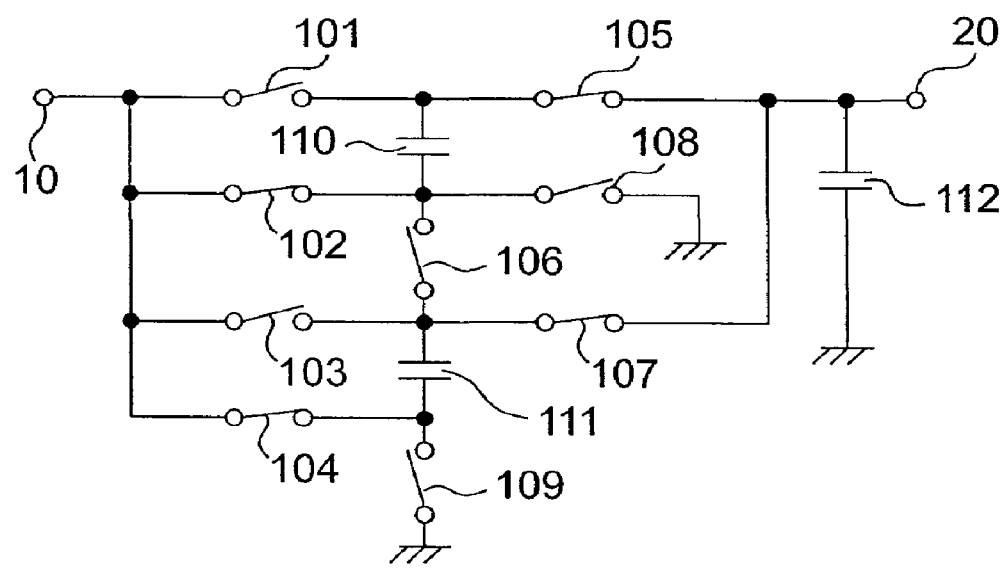
Figure 11A:
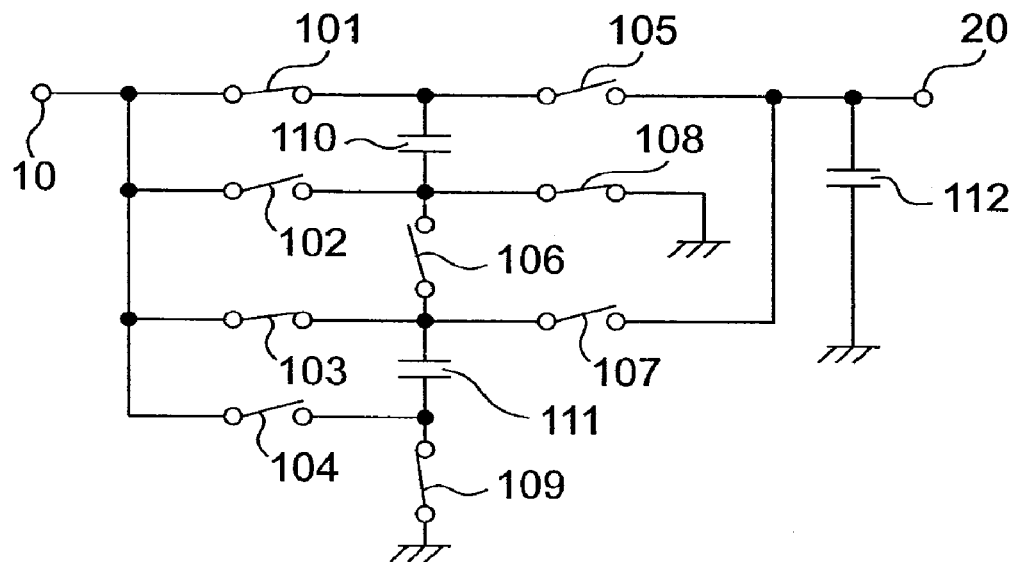
FIGS. 11A and 11B are equivalent circuit diagrams showing the 2Vi mode of the conventional charge pump circuit.
Figure 11B:
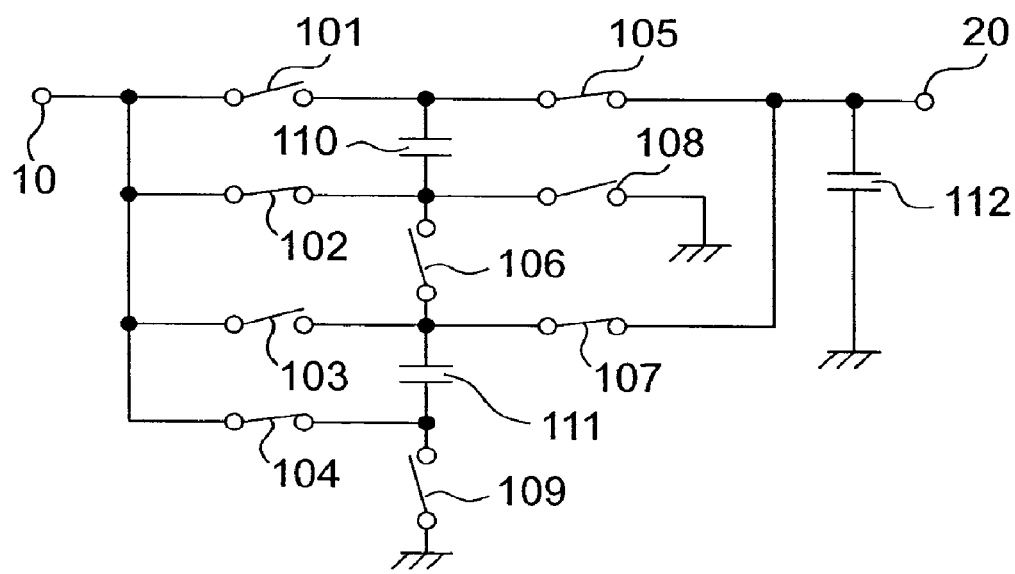

As described above, in the charge pump circuit according to the first embodiment, the power supply circuit, having fewer switching devices than the conventional example shown in FIG. 8, can appropriately select a voltage multiple ratio of 1, 1.5 or 2 with respect to the input voltage, convert the input voltage and output the converted voltage. For example, in comparison with the conventional charge pump circuit shown in FIG. 8, the charge pump circuit according to the first embodiment does not require the switching device (103), the potential of the back gate of which is switched. Therefore, the charge pump circuit according to the first embodiment has eight switching devices, fewer than the conventional example, and can select a voltage multiple ratio of 1, 1.5 or 2, convert its input voltage and output the converted voltage.

Second Embodiment

Figure 4:
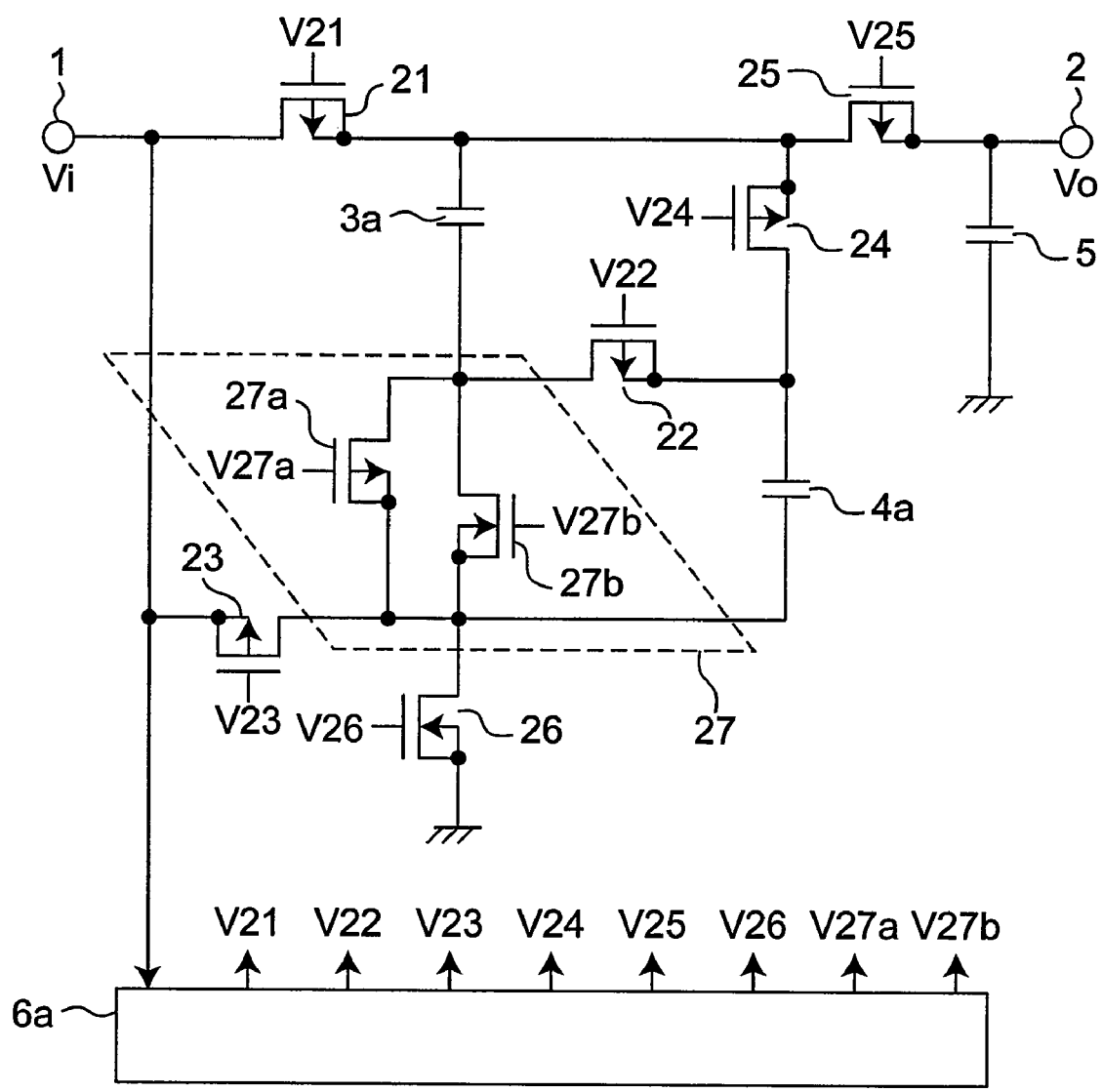
FIG. 4 is a circuit diagram showing a charge pump circuit according to a second embodiment of the present invention.

FIG. 4 is a circuit diagram showing a charge pump circuit according to a second embodiment of the present invention. In the charge pump circuit according to the second embodiment shown in FIG. 4, a DC input voltage Vi is applied to an input terminal 1, the input voltage Vi is detected, a voltage multiple ratio is selected, and a desired output voltage Vo is output from an output terminal 2. The charge pump circuit according to the second embodiment comprises eight switching devices, a first capacitor 3a, a second capacitor 4a, and an output capacitor 5. The output capacitor 5 is connected to the output terminal 2, and the DC output voltage Vo is output to a load (not shown). The first capacitor 3a and the second capacitor 4a have the same capacitance.

A control circuit 6a outputs drive signals V21, V22, V23, V24, V25, V26, V27a and V27b to the corresponding respective switching devices. The first switch 21 is connected between the input terminal 1 and one terminal of the first capacitor 3a, and is turned ON/OFF by the drive signal V21. The second switch 22 is connected between the other terminal of the first capacitor 3a and one terminal of the second capacitor 4a, and is turned ON/OFF by the drive signal V22. The third switch 23 is connected between the input terminal 1 and the other terminal of the second capacitor 4a, and is turned ON/OFF by the drive signal V23. The fourth switch 24 is connected between the one terminal of the first capacitor 3a and the one terminal of the second capacitor 4a, and is turned ON/OFF by the drive signal V24. The fifth switch 25 is connected between the one terminal of the first capacitor 3a and the output terminal 2, and is turned ON/OFF by the drive signal V25. The above-mentioned first to fifth switches 21 to 25 are formed of P-channel MOS transistors.

The sixth switch 26 is formed of an N-channel MOS transistor connected between the other terminal of the second capacitor 4a and the ground, and is turned ON/OFF by the drive signal V26. The seventh switch 27, formed of a P-channel MOS transistor 27a and an N-channel MOS transistor 27b being connected in parallel, is connected between the other terminal of the first capacitor 3a and the other terminal of the second capacitor 4a. In the seventh switch 27, the P-channel MOS transistor 27a is turned ON/OFF by the drive signal V27a, and the N-channel MOS transistor 27b is turned ON/OFF by the drive signal V27b.

The control circuit 6a detects the input voltage Vi and compares the detected input voltage Vi with a first predetermined value (X) and a second predetermined value (Y). The first predetermined value (X) is set lower than the second predetermined value (Y) (X<Y). When the input voltage Vi is lower than the first predetermined value (X) (Vi<X), the control circuit 6a selects an operation mode having a voltage multiple ratio of 2 (2Vi mode). When the input voltage Vi is equal to or more than the first predetermined value (X) and lower than the second predetermined value (Y) (X≦Vi<Y), the control circuit 6a selects an operation mode having a voltage multiple ratio of 1.5 (1.5Vi mode). When the input voltage Vi is equal to or more than the second predetermined value (Y) (Y≦Vi), the control circuit 6a selects an operation mode having a voltage multiple ratio of 1 (1Vi mode). Then, the control circuit 6a controls the ON/OFF operations of the respective switching devices. Boosting the input voltage Vi as described above can compensate for any voltage drop in a DC power supply, such as a battery.

Figure 5A:
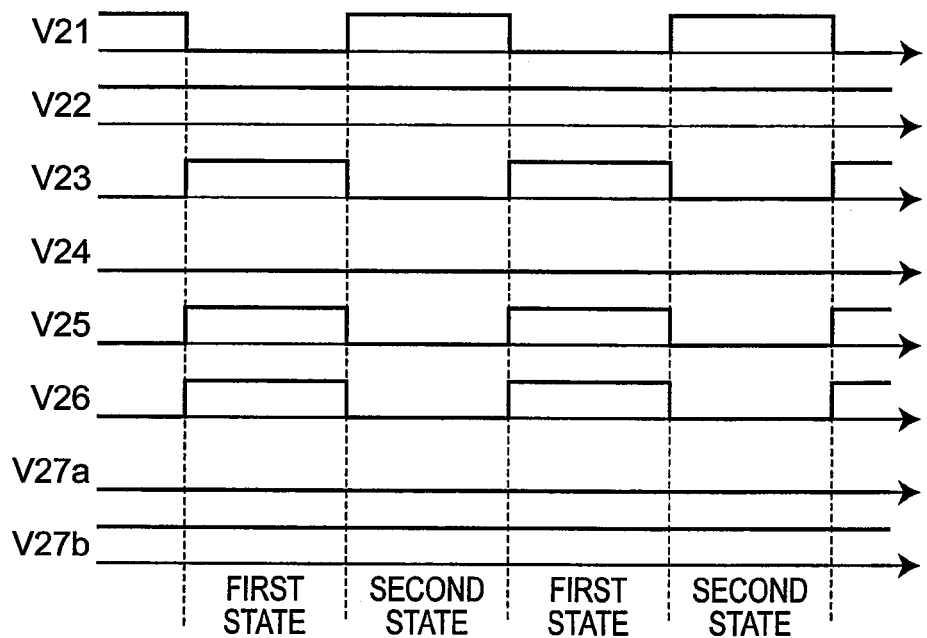
FIG. 5A is a timing chart showing various drive signals in the 2Vi mode of the charge pump circuit according to the second embodiment.
Figure 5B:
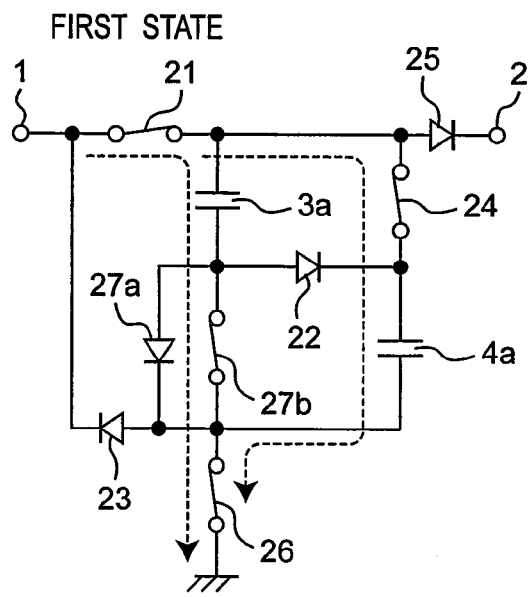
FIG. 5B is an equivalent circuit diagram showing a first state in the 2Vi mode of the charge pump circuit according to the second embodiment.
Figure 5C:
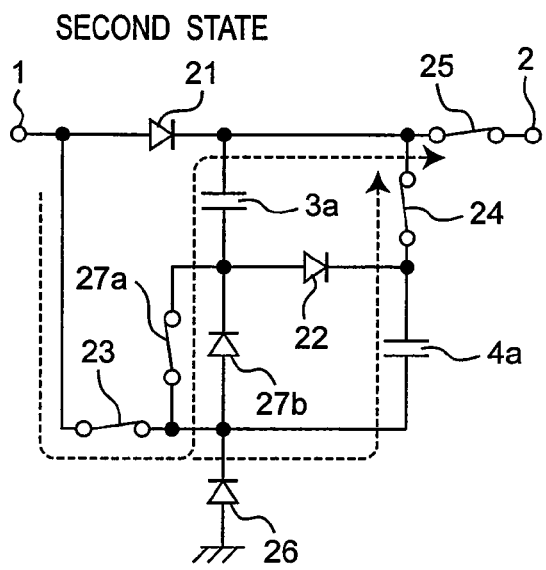
FIG. 5C is an equivalent circuit diagram showing a second state in the 2Vi mode of the charge pump circuit according to the second embodiment.

FIG. 5A shows the operation waveforms of the drive signals V21 to V26, V27a and V27b in the 2Vi mode. FIGS. 5B and 5C are equivalent circuit diagrams showing the ON/OFF states of the respective switching devices in the first and second states of the 2Vi mode.

As shown in FIG. 5B, in the first state of the 2Vi mode, the first switch 21, the fourth switch 24, the sixth switch 26, and the N-channel MOS transistor 27b of the seventh switch 27 are ON, and the other switches are OFF. Each switch being OFF is shown with a body diode. The P-channel MOS transistor 27a of the seventh switch 27 cannot be turned ON because although the gate potential thereof, that is, the drive signal V27a, is low, the source potential thereof is also low. In the first state, both the first capacitor 3a and the second capacitor 4a are charged by the input voltage Vi.

Next, as shown in FIG. 5C, in the second state of the 2Vi mode, the third switch 23, the fourth switch 24, the fifth switch 25, and the P-channel MOS transistor 27a of the seventh switch 27 are ON, and the other switches are OFF. The N-channel MOS transistor 27b of the seventh switch 27 cannot be turned ON because although the gate potential thereof, that is, the drive signal V27b, is high, the source potential thereof is also high (the input voltage Vi). In the second state, the first capacitor 3a and the second capacitor 4a are connected in parallel between the input terminal 1 and the output terminal 2, and their charges are discharged to the output side.

As described above, in the 2Vi mode, the first state and the second state are repeated alternately, whereby the voltage of the parallel connection configuration of the first capacitor 3a and the second capacitor 4a being charged to the input voltage Vi in the first state is added to the input voltage Vi of the input terminal 1 in the second state. As a result, a voltage equal to approximately 2 times the input voltage Vi is generated at the output terminal 2.

Figure 6A:
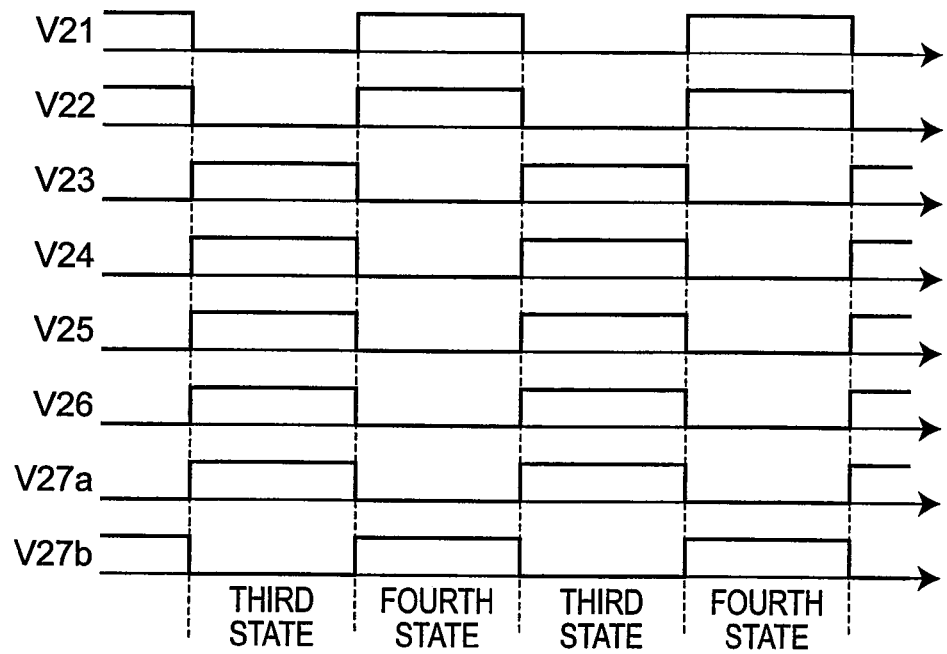
FIG. 6A is a timing chart showing various drive signals in the 1.5Vi mode of the charge pump circuit according to the second embodiment.
Figure 6B:
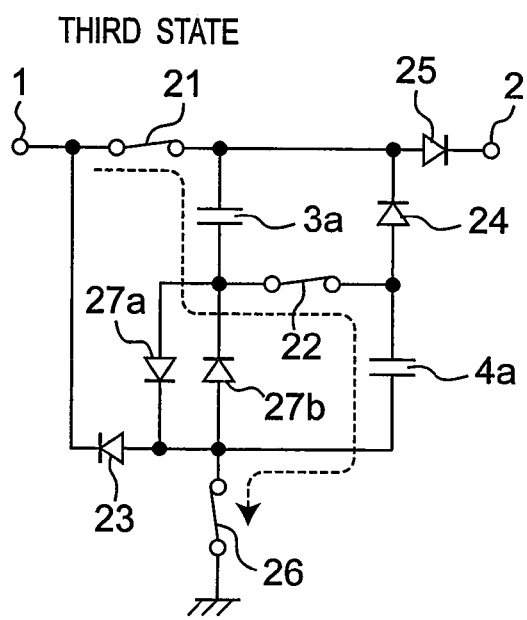
FIG. 6B is an equivalent circuit diagram showing a third state in the 1.5Vi mode of the charge pump circuit according to the second embodiment.
Figure 6C:
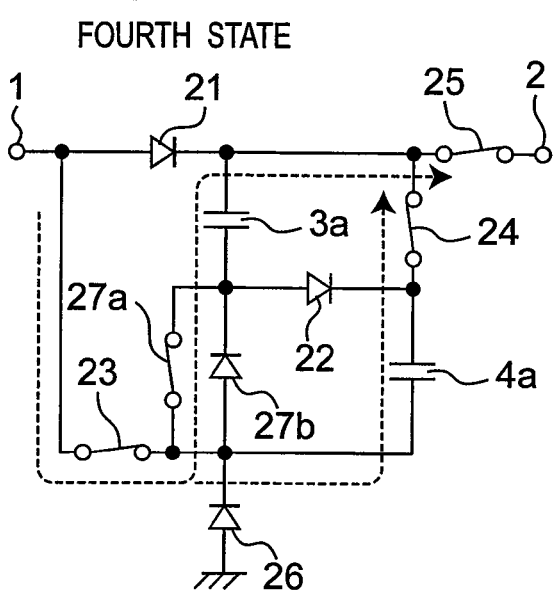
FIG. 6C is an equivalent circuit diagram showing a fourth state in the 1.5Vi mode of the charge pump circuit according to the second embodiment.

FIG. 6A shows the operation waveforms of the drive signals V21 to V26, V27a and V27b in the 1.5Vi mode. FIGS. 6B and 6C are equivalent circuit diagrams showing the ON/OFF states of the respective switching devices in the third and fourth states of the 1.5Vi mode.

As shown in FIG. 6B, in the third state of the 1.5Vi mode, the first switch 21, the second switch 22, and the sixth switch 26 are ON, and the other switches are OFF. Each switch being OFF is shown with a body diode. Hence, the first capacitor 3a and the second capacitor 4a are connected in series and charged by the input voltage Vi. In other words, the first capacitor 3a and the second capacitor 4a are each charged by approximately half (Vi/2) of the input voltage Vi.

Next, as shown in FIG. 6C, in the fourth state of the 1.5Vi mode, the third switch 23, the fourth switch 24, the fifth switch 25, and the P-channel MOS transistor 27a of the seventh switch 27 are ON, and the other switches are OFF. The N-channel MOS transistor 27b of the seventh switch 27 cannot be turned ON because although the gate potential thereof, that is, the drive signal V27b, is high, the source potential thereof is also high (the input voltage Vi). In the fourth state, the first capacitor 3a and the second capacitor 4a are connected in parallel between the input terminal 1 and the output terminal 2, and their charges are discharged to the output side.

As described above, in the 1.5Vi mode, the third state and the fourth state are repeated alternately, whereby the voltage charged in each capacitor in the third state, amounting to approximately half (Vi/2) of the input voltage Vi, is added to the input voltage Vi of the input terminal 1 in the fourth state. As a result, a voltage equal to approximately 1.5 times the input voltage Vi is generated at the output terminal 2.

In the 1Vi mode, although not shown, the first switch 21, the second switch 22, the fifth switch 25, and the sixth switch 26 are ON, and the other switches are OFF. Hence, the first capacitor 3a and the second capacitor 4a are connected in series and charged by the input voltage Vi, and the input terminal 1 and the output terminal 2 are short-circuited by the first switch 21 and the fifth switch 25, these two switches being ON. As a result, a voltage equal to approximately 1 times the input voltage Vi is generated at the output terminal 2.

As described above, in the charge pump circuit according to the second embodiment, the power supply circuit having fewer switching devices can select a voltage multiple ratio of 1, 1.5 or 2 with respect to the input voltage, convert the input voltage and output the converted voltage. For example, in comparison with the conventional charge pump circuit shown in FIG. 8, the charge pump circuit according to the second embodiment does not require the switching device (103), the potential of the back gate of which is switched. Therefore, the charge pump circuit according to the second embodiment has eight switching devices, fewer than the conventional example, and can select a voltage multiple ratio of 1, 1.5 or 2, convert its input voltage and output the converted voltage.

In the 1Vi mode of the charge pump circuit according to the first and second embodiments, the first capacitor and the second capacitor are connected in series and charged by the input voltage Vi. This configuration is used to suppress the fluctuations in the respective capacitor voltages when the input voltage Vi lowers and the operation mode is switched to the 1.5Vi mode, and thereby to carry out smooth operation mode switching.

Third Embodiment

In the second embodiment described above, the seventh switch 27 is formed of the P-channel MOS transistor 27a and the N-channel MOS transistor 27b connected in parallel because the current flows in both directions, and the ground potential and the input voltage Vi are applied. Hence, in the third state of the 1.5Vi mode and in the 1Vi mode of the charge pump circuit according to the second embodiment, the P-channel MOS transistor 27a and the N-channel MOS transistor 27b of the seventh switch 27 are OFF, and the body diodes of these are connected in parallel and in both directions. Hence, the voltage of the second capacitor 4a in the second embodiment is limited so as not be higher than the forward voltage of the body diode of the P-channel MOS transistor 27a and the N-channel MOS transistor 27b.

Unlike the case of the first embodiment, the voltage of the second capacitor 4a of the charge pump circuit according to the second embodiment is limited as described above. With this configuration, the first capacitor 3a and the second capacitor 4a are charged at the same timing regardless of the operation mode, and the charging current flows through the sixth switch 26 (see FIG. 4). Hence, the charged amounts of the first capacitor and the second capacitor can be adjusted by controlling the ON-resistance of the sixth switch 26. The output voltage Vo can be adjusted to a predetermined voltage value by adjusting the charged amount of each capacitor as described above.

Figure 7:
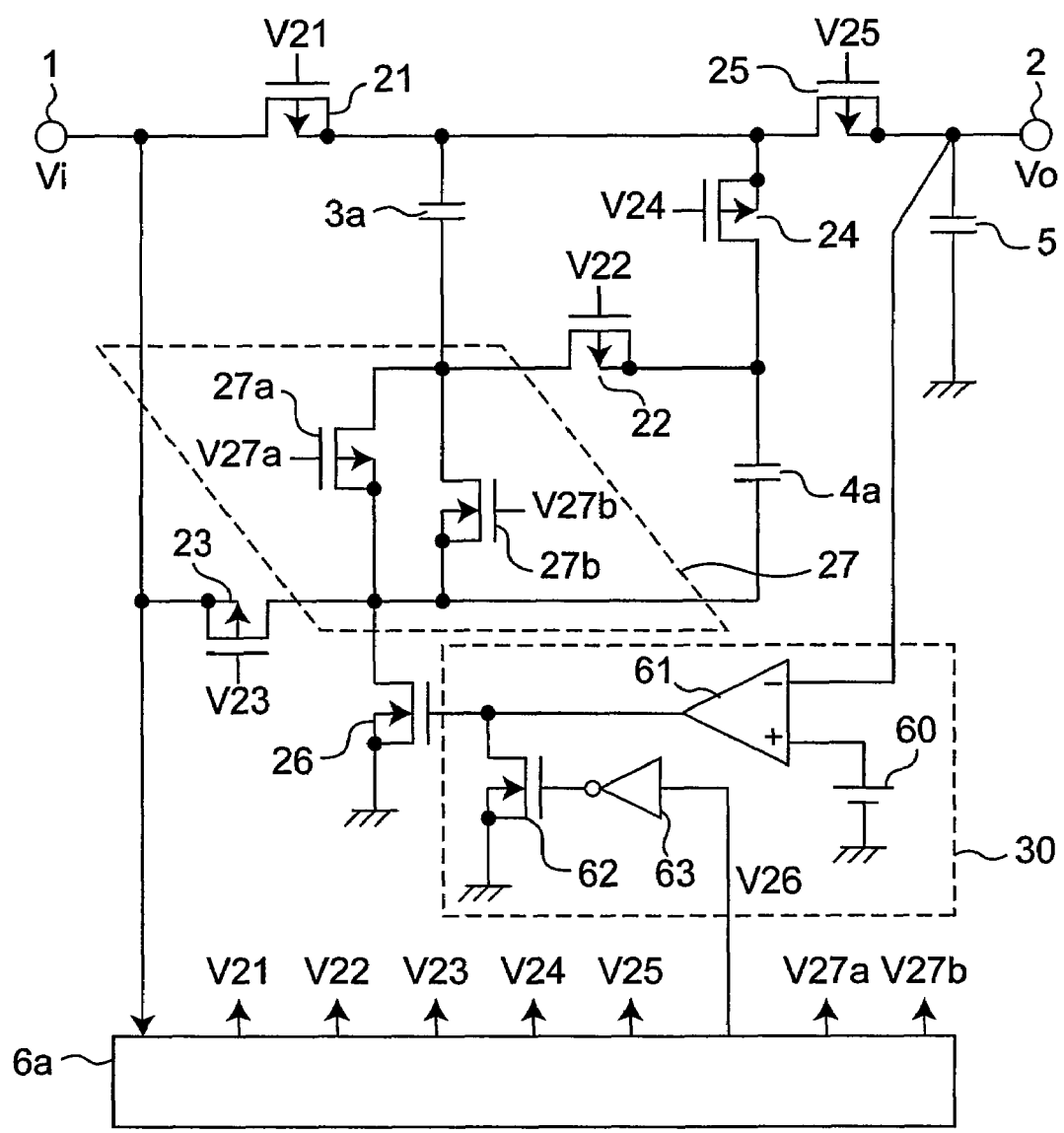
FIG. 7 is a circuit diagram showing a charge pump circuit according to a third embodiment of the present invention.

A charge pump circuit provided with a feedback circuit for adjusting the output voltage Vo to a predetermined voltage value is described below as a third embodiment of the present invention. FIG. 7 is a circuit diagram showing the charge pump circuit according to the third embodiment of the present invention. In the third embodiment, components having the substantially same configurations and performing the same operations as those of the charge pump circuit according to the second embodiment shown in FIG. 4 are designated by the same numerals, and their descriptions are omitted herein by incorporating the descriptions in the second embodiment.

The charge pump circuit shown in FIG. 7 differs from the charge pump circuit according to the second embodiment shown in FIG. 4 in that the drive signal V26 is input to the sixth switch 26 via a feedback circuit 30. The feedback circuit 30 comprises a reference voltage supply 60; an error amplifier 61 to which the output voltage Vo and the voltage of the reference voltage supply 60 are input; an N-channel MOS transistor 62, the drain of which is connected to the output of the error amplifier 61, and the source of which is grounded; and an inverter 63 for inverting the drive signal V26 output from the control circuit 6a and applying the inverted signal to the gate of the N-channel MOS transistor 62. The output of the error amplifier 61 of the feedback circuit 30 is applied to the sixth switch 26 formed of an N-channel MOS transistor.

The adjustment operation for the output voltage Vo in the charge pump circuit according to the third embodiment configured as described above will be described below. The output voltage Vo of the charge pump circuit according to the third embodiment is adjusted by controlling the ON-resistance of the sixth switch 26.

First, when the drive signal V26 is low, the sixth switch 26 is OFF in the second embodiment and is also OFF in the third embodiment. In other words, the drive signal V26 being low is driven high by the inverter 63. Hence, the N-channel MOS transistor 62 is turned ON, and the gate of the sixth switch 26 is grounded, whereby the sixth switch 26 is turned OFF.

Next, when the drive signal V26 is high, the N-channel MOS transistor 62 is OFF, and the gate potential of the sixth switch 26 is equal to the output voltage of the error amplifier 61. The output voltage of the error amplifier 61 is obtained by amplifying the error between the output voltage Vo and the voltage of the reference voltage supply 60. When the output voltage Vo becomes higher than the voltage of the reference voltage supply 60, the output voltage of the error amplifier 61 lowers, thereby increasing the ON-resistance of the sixth switch 26. Hence, the charging current for the first capacitor 3a and the second capacitor 4a, flowing through the sixth switch 26, is limited, and the charged voltages of the capacitors are lowered. Since the charged voltages are added to the input voltage Vi and then output, when the charged voltages of the first capacitor 3a and the second capacitor 4a are lowered, the output voltage Vo is also lowered.

In contrast, when the output voltage Vo becomes lower than the voltage of the reference voltage supply 60, the output voltage of the error amplifier 61 rises, thereby decreasing the ON-resistance of the sixth switch 26. Hence, the charging current for the first capacitor 3a and the second capacitor 4a increases, and the charged voltages of the capacitors are raised, and the output voltage Vo is also raised.

By the operations described above, the output voltage Vo of the charge pump circuit according to the third embodiment is controlled so as to be equal to the voltage of the reference voltage supply 60.

The charge pump circuit according to the present invention is thus highly versatile and useful for power supply circuits and the like for supplying DC voltages to various types of electronic apparatuses.

Although the present invention has been described with respect to its preferred embodiments in some detail, the disclosed contents of the preferred embodiments may change in the details of the structure thereof, and any changes in the combination and sequence of the components may be attained without departing from the scope and spirit of the claimed invention.

What is claimed is:

1. A charge pump circuit comprising:
   an input terminal to which an input voltage is input;
   an output terminal from which an output voltage is output;
   a ground terminal;
   capacitor means having at least a first capacitor and a second capacitor;
   a first switch connected between said input terminal and one terminal of said first capacitor;
   a second switch connected between the other terminal of said first capacitor and one terminal of said second capacitor;
   a third switch connected between said input terminal and the other terminal of said second capacitor;
   a fourth switch connected between the one terminal of said first capacitor and the one terminal of said second capacitor;
   a fifth switch connected between the one terminal of said first capacitor and said output terminal;
   a sixth switch connected between the other terminal of said second capacitor and said ground terminal;
   a seventh switch connected between the other terminal of said first capacitor and the other terminal of said second capacitor; and
   a control circuit for controlling the ON/OFF operations of said respective switches, wherein
   said control circuit has:
   a 2Vi mode for alternately repeating a first state wherein said first capacitor and said second capacitor are connected in parallel and charged by said input voltage, and a second state wherein said first capacitor and said second capacitor are connected in parallel between said input and output terminals and discharged to the output side; and
   a 1.5Vi mode for alternately repeating a third state wherein said first capacitor and said second capacitor are connected in series and charged by said input voltage, and a fourth state wherein said first capacitor and said second capacitor are connected in parallel between said input and output terminals and discharged to the output side.

2. The charge pump circuit according to claim 1, wherein said control circuit carries out control so that:
   in said first state, said first switch, said fourth switch, said sixth switch, and said seventh switch are ON, and the other switches are OFF;
   in said second state, said third switch, said fourth switch, said fifth switch, and said seventh switch are ON, and the other switches are OFF;
   in said third state, said first switch, said second switch, and said sixth switch are ON, and the other switches are OFF; and
   in said fourth state, said third switch, said fourth switch, said fifth switch, and said seventh switch are ON, and the other switches are OFF.

3. The charge pump circuit according to claim 2, wherein said control circuit has a 1Vi mode in which said first switch, said second switch, said fifth switch, and said sixth switch are ON, and the other switches are OFF.

4. The charge pump circuit according to claim 3, wherein said control circuit selects said 2Vi mode, said 1.5Vi mode, or said 1Vi mode on the basis of said input voltage.

5. The charge pump circuit according to claim 1, wherein said seventh switch is formed of a P-channel MOS transistor and an N-channel MOS transistor connected in parallel.

6. The charge pump circuit according to claim 1, wherein a feedback circuit for adjusting the ON-resistance of said sixth switch is provided to control said output voltage.

7. The charge pump circuit according to claim 6, wherein said feedback circuit has a differential amplifier for comparing said output voltage with a reference voltage and amplifying the difference therebetween, said sixth switch is OFF when a drive signal from the control circuit for said sixth switch is OFF, and said sixth switch is driven by an output of said differential amplifier when the drive signal for said sixth switch is ON.

* * * * *